United States Patent
Finley et al.

[15] 3,643,969
[45] Feb. 22, 1972

[54] PLUNGER OPERATED ROTATABLE COLLET

[72] Inventors: Robert L. Finley, Norfolk; Raymond E. Sansom, New Milford, both of Conn.

[73] Assignee: Diventco, Inc., New Milford, Conn.

[22] Filed: Jan. 12, 1970

[21] Appl. No.: 2,428

[52] U.S. Cl. ...................................279/4, 90/11 A, 279/20, 408/56
[51] Int. Cl. .........................................................B23b 31/30
[58] Field of Search ....................279/20, 4; 90/11 A; 408/56

[56] References Cited

UNITED STATES PATENTS

| | | | |
|---|---|---|---|
| 3,177,775 | 4/1965 | Alisauskis | 90/11 A |
| 2,886,007 | 5/1959 | Manchester | 279/4 X |
| 3,210,088 | 10/1965 | Williamson et al. | 279/4 |

*Primary Examiner*—William S. Lawson
*Assistant Examiner*—James F. Coan
*Attorney*—Cesari and McKenna

[57] ABSTRACT

A machine tool spindle characterized by excellent dynamic balance at very high rates of rotation and adapted for automatic tool changing has a tool-holding collet actuated by a plunger coaxial with the spindle. The plunger is maintained in the tool-holding position by belleville springs that rotate with the plunger and collet and a nonrotating push rod engages the plunger and drives it against the spring bias to open the collet when a tool is to be released or picked up. Advantageous embodiments of the invention, the collet draws air through a small conduit in the spindle, thereby cleaning dust from the collet fixture.

16 Claims, 3 Drawing Figures

PATENTED FEB 22 1972 3,643,969

INVENTOR
ROBERT L. FINLEY
RAYMOND E. SANSOM
BY
*Cesari & McKenna*
ATTORNEYS

PLUNGER OPERATED ROTATABLE COLLET

BACKGROUND OF THE INVENTION

A. Field of the Invention

This invention relates to machine tool spindles, and more particularly, to a spindle having a plunger-operated rotatable collet that is adapted for use on automatic machines.

A collet generally comprises a plurality of resilient jaws closeable for holding a tool in one position but which are adapted to open to release the tool when required. The jaws collectively form a socket for receiving a tool shank. A compressive force applied to the jaws by means of a cam arrangement forces the jaws inward to tightly hold the tool shank disposed in the socket. The jaws are normally biased apart and therefore the tool shank is released when the compressive force is removed.

B. Prior Art

Because great forces are exerted on a cutting tool during its operation, the jaws must be relatively rigid members. Consequently, a great force is necessary to deflect or radially compress these jaws. A threaded means, as utilized in a common chuck, is usually utilized to provide this compressive force. A chuck normally comprises an outer sleevelike member having tapered inner portions movable longitudinally of the tool axis and coacts with threaded and tapered portions on the exterior of jaws themselves. The compressive force generated by screwing the sleevelike member over the jaws generates the force needed to compress the jaws. However, the above-described type of collet is not readily adapted for use with fast-cycling automatic machines because of the time needed to thread and unthread the chuck. In addition, the threading and unthreading of a rotatable chuck is difficult to accomplish automatically because the mechanism must transfer a force from a stationary device to one that rotates.

Another type of collet-operating apparatus is utilized in some automatic machines. In this type, pneumatic or hydraulic power is used to provide the force needed to radially deflect the jaws. The same coacting tapers are used, but the threads are eliminated. Suitable valving is provided and an axially slidable member is driven back and forth to engage or release a tool.

The foregoing fluid-powered type of collet actuators have certain shortcomings. For example, because a collet is a tool-holding device mounted on a rotatable spindle, an activating force must be transferred from a nonrotatable to a rotatable member. When fluid-pressure actuating devices are used, high-speed rotary seals are necessary to prevent leaks at the point of connection between the rotating spindle and the power source. These seals are normally very expensive and marginally reliable at best. Moreover since much of the fast-cycling machinery requires very high-speed rotation (typically 20,000 to 80,000 r.p.m. or higher) of tools, it is very important that the tool-holding apparatus have exceptionally good dynamic balance at high-rotational speeds. This requirement usually has the practical effects of restricting the diameter and mass of the rotating parts and making it necessary to machine all rotating parts to assure a suitable symmetry.

However, even when this is done, it is not always possible to assure continued symmetry during operation of the apparatus. For example, in some high-spped machining operations dust or powder tends to clog the tool or tool-holding parts of the machinery and, in addition to the obvious inconveniences and drawbacks this causes in the operation of high-speed machinery designed to perform hundreds of operations per second, there is a problem in effectively removing such contamination in order to keep the tools dynamically balanced at high rates of rotation.

Until the present time, no suitable solutions have been found for the aforementioned problems.

OBJECTS OF THE INVENTION

Accordingly, it is an object of the present invention to provide an improved machine tool spindle having a collet-operating assembly adapted for use with automatic machines.

It is another object of the present invention to provide an improved collet-operating assembly for a machine tool spindle that is rotationally balanced and inexpensive to construct.

Another object of the invention is to provide an improved machine tool-holding assembly wherein the high-speed rotational of the tool is utilized to keep the tool clean.

A further object of the invention is to provide a novel process for maintaining a machine tool clean during the operation thereof without interfering with the dynamic rotational balance of the tool.

Other objects of the invention will be obvious to those skilled in the art on reading this application.

BRIEF SUMMARY OF THE INVENTION

Applicants have substantially achieved the foregoing objects by providing a spindle having a collet which includes conventional deflectable jaws that are biased into a tool shank holding position by small-diameter, symmetrical, high resistance bearing means such as belleville spring washers. Cleaning action is achieved by providing a conduit in the spindle through which air is drawn by the rotational movement of the collet and/or tool held therein. More specifically, a rotatable spindle body has an inwardly tapering diameter at one end thereof which can mate with the outwardly tapered surface of the collet jaws. The jaws are attached to a draw bar passing through the rotatable spindle and can be drawn axially into a tool holding position by use of belleville springs that are compressed between the spindle body and a tension-adjusting nut at the end of the draw bar. That is, the spring action drives the spindle body forward so that its inwardly tapering diameter effectively cams the jaws shut to hold a tool shank in a socket defined by the jaws. The very high spring rates of belleville springs are used to hold the tool. A nonrotatable plunger selectively engages the end of the draw bar and compresses the belleville springs to disengage the collet jaws from the spindle body and thereby release a tool when the spindle is stationary but without interfering with the rotary motion of the spindle body itself. Despite the plurality of advantages of the apparatus, its simple construction allows all of the rotatable parts to be selected from readily available stock and to be symmetrical about the axis of rotation of the body. This latter fact obviates the imbalance problem.

BRIEF DESCRIPTION OF THE DRAWINGS

For a fuller understanding of the nature and objects of the invention, reference should be had to the following detailed description taken in connection with the accompanying drawings, in which.

DETAILED DESCRIPTION OF THE INVENTION

Figure 1:
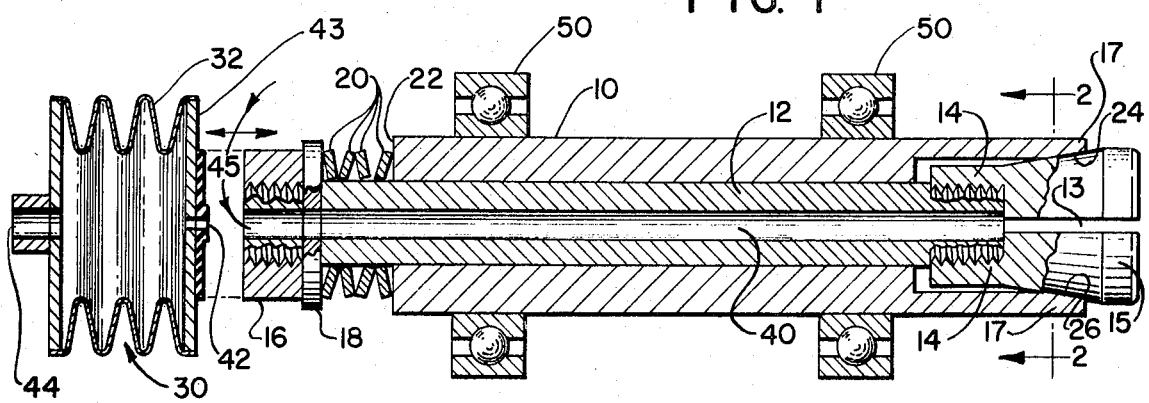
FIG. 1 is a sectional view of the present invention.
Figure 2:
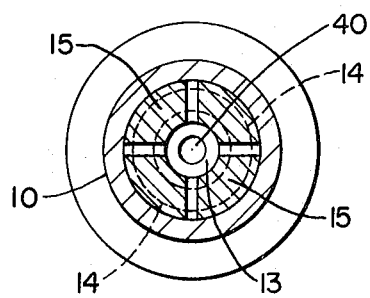
FIG. 2 is a sectional view taken along line 2—2 of FIG. 1.

Referring to FIG. 1, a spindle body 10 is rotatably driven by a motor through gears or belts. These drive means are not shown in the drawings. An elongated draw bar 12 is slidably disposed within spindle body 10 for movement between two extreme positions. One extreme position, that is shown in FIG. 1, is a tool-holding position and another is a tool-releasing position. A collet 14 is threaded onto one end of draw bar 12 and includes jaws 15 that form a tool socket 13 to hold a drill or other type of rotatable cutting tool. More specifically, as best seen in FIG. 2, collet 14 includes four spaced jaws which are adapted to be radially compressed or deflected to hold a tool shank. Axial movement of the jaws causes their deflection into engagement with the inwardly tapered sleeve 17 of spindle body 10 in a manner hereinafter described. The spaced jaws 15 are normally biased apart forming means to receive a tool shank, and only by engagement with sleeve 17 are the jaws deflected sufficiently to hold a shank snugly.

The opposite end of draw bar 12 is also threaded and carries a tension adjusting nut 16 that engages a flat washer 18 and belleville spring washers 20 which together form means to bias draw bar 12 along the axial direction thereof. Nut 16 adjustably maintains belleville spring washers 20 under compression between wall 22 of spindle 10 and flat washer 18. The amount of holding force exerted on a tool in socket 13 is determined by the amount of compression of the belleville spring washers 20 as adjustably controlled by nut 16.

More specifically, inwardly tapered conical surface 24 of spindle body 10 cooperates with outwardly tapering conical surface 26 of collet 14. Axial movement of draw bar 12 to the left (FIG. 1) under the force exerted by the belleville spring radially deflects the opposed jaws 15 of collet 14 into engagement with the periphery of a cutting tool shank in socket 13. The force of the belleville spring is sufficient to maintain the collet jaws in tight engagement with a tool shank for operative rotation of the tool with the spindle body 10.

Conversely biased movement of the draw bar 12 to the right resisted by the force of the belleville spring permits the collet jaws to open in response to the internal bias of the collet.

This is accomplished by utilization of a plunger 30 advantageously formed of a metal bellows 32 the interior of which communicates with a source of pressurized fluid. This source is not shown in the drawings as such sources, such as pressurized air cylinders are well known in the art. When fluid under high pressure is supplied to bellows 32, the bellows is expanded to thrust plunger 30 to the right against draw bar 12 and thus cause collet 14 to be freed from compressive relationship with sleeve 17 of spindle body 10. Thus socket 13 is opened and any tool held therein will drop therefrom. The spindle will then be moved to engage the shank of another tool to be substituted for the first tool. When the second tool is loosely positioned in socket 13, plunger 30 is retracted by decreasing the fluid pressure in bellows 32. This allows the belleville spring washers 20 to pull draw bar 12 to the left thereby again compressing jaw 15 to close socket 13 and securing the second tool for the next machine operation.

A particularly advantageous feature of the invention is the fluid-cleaning system forming part of the apparatus. This system is an ideal complement to the quickly actuatable collet-gripping structure described above.

In machining of many materials, a great deal of dust is generated which tends to clog the collet and collet-gripping mechanism. In order to avoid this problem, applicant has utilized the rotation of his tool-gripping collet to such a stream of fluid, e.g., air through a conduit 40 communicating with collet 14 through hollow draw bar 12 and tension adjusting nut 16.

Although conduit 40 is open to the environmental air supply when the plunger 30 is retracted and the collet is in the position as shown in FIG. 1, it will be noted that the direct air path 45 from the environment is cut off when plunger 30 pushes against washer 16. This problem is avoided by having the air supplied to conduit 40 through a small orifice 42 in the piston 43 of plunger 30. Orifice 42 is sized to be sufficiently smaller with respect to orifice inlet port 44 so that air leakage through inlet 40 is at a level that can be tolerated without interference with the efficient action of bellows 32.

The collet 14, draw bar 12, spindle 10, belleville washers 20, washer 18 and nut 16 are all substantially symmetrical, with respect to their mass, about the rotational axis of spindle 10. Therefore, when spindle 10 rotates, the system is dynamically balanced. This minimizes tool vibration and movement which would adversely affect the life of the assembly as well as dimensional integrity of the aperture or area to be machined, particularly when high rotational speeds are used.

Therefore, the main objectives of the present invention have been accomplished and an economical balance tool holder has been provided having sufficient holding force to firmly grip a rotating cutting tool. This tool holder is very readily adapted for automatic operation.

Although the invention has been described utilizing belleville spring washers, it is to be understood that other biasing means can be used providing such means are substantially symmetrical by turning on a lath or the like.

Figure 3:
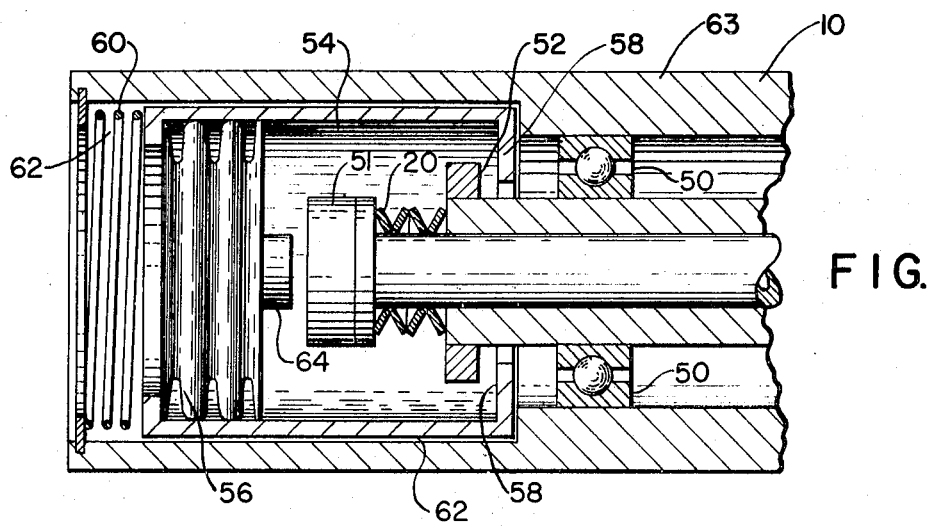
FIG. 3 shows another embodiment of the invention, one that has been discovered to provide a means for limiting the amount of stress placed on ball bearings 50 during tool change.

In FIG. 3, a flange 52 is attached to a spindle 10 and a sleeve 54 is mounted on the plunger-actuating means such as air cylinder 56. Sleeve 54 has an inwardly turning collar 58 and is biased against the spindle housing by a spring 60. Sleeve 54 and a spring 60 fit into a recess 62 in spindle housing 63.

In this arrangement, when plunger-actuating means 56, moves plunger 64 forward, the plunger contacts nut 51 and is restrained thereby until collar 58 is pulled back to the left against the relatively weak bias of spring 60 to bear against flange 52. Thereafter thrust exerted is transferred to collar 58 rather than the ball bearings 50. As plunger 64 continues to advance, the spindle is withdrawn as has been described for the apparatus shown in FIG. 2. But what has been accomplished is that the ball bearings are placed under very little or no stress compared with the stress that can be exerted on them in that embodiment of the invention disclosed in FIG. 1.

The plunger is used, not only to advance the collet but also to pull back a spindle-restraining means into engagement with the spindle, thereby providing means to oppose and absorb the reaction forces to those forces required to compress the Belleville spring washers. This absorption is achieved without excessive loading of the ball bearings in which the spindle rotates. In practice, this means bearing means with lower stress resistance can be utilized with the apparatus described in FIG. 3 than can be utilized with the apparatus disclosed in FIG. 1.

Moreover, the principle whereby a machine tool gripping fixture is utilized as a turbine for drawing cleaning and cooling air to the work zone through a rotating shaft will be recognized by those skilled in the art, on their reading of this specification, to be applicable to the use of any high-speed tool fixture capable of acting as a turbine and is not restricted to the use of the collet specifically described hereinabove.

While the embodiment of the present invention as herein disclosed constitutes the preferred form, it is to be understood that other forms might be adapted.

We claim:

1. A machine tool spindle having a plunger-operated rotatable collet comprising:
   a. a rotatable body;
   b. tool-holding means slidably disposed in said body for movement between extreme positions;
   c. a rotationally balanced biasing means acting between said body and said tool-holding means to bias said tool-holding means toward a closed tool-gripping position, said tool-holding means being drivable against the bias of said biasing means to a second extreme position into an open tool-releasing position; and wherein said rotatable body is mounted in bearing means and comprising;
   d. an expandable plunger-actuating means situated between said rotationally balanced biasing means and a second, less resistant biasing means; and
   e. a spindle-restraining means mounted for rearward movement with said expanding plunger-actuating means and adapted to engage said spindle thereby providing means to oppose with an equal and opposite force, any force exerted on said rotationally balanced biasing means by said plunger-actuating means without transmitting said force through said bearing means.

2. A machine tool spindle according to claim 1 where said biasing means is symmetrical about the axis of rotation of said body.

3. A machine tool spindle according to claim 2 wherein said tool-holding means is moved to said second extreme position by a linearly moving plunger.

4. A machine tool spindle according to claim 3 wherein said biasing means includes at least one belleville spring washer.

5. A machine tool spindle according to claim 4 wherein said tool-holding means including an elongated bar threaded on opposite ends, a first end being threaded to a collet having deflectable jaws and a second end carrying said biasing means.

6. A machine tool spindle according to claim 5 wherein said body has a tapered portion and said collet has an opposite and complementary shaped tapered portion acting against said tapered portion on said body thereby deflecting said collet jaws to tighten around a tool when said biasing means is the dominant force acting on said tool-holding means.

7. A machine tool spindle according to claim 6 wherein said collet jaws are biased toward said open position wherein a tool is loosely held, said collet jaws being allowed to assume the free position when a plunger acts against said second end of said elongated bar and overcomes the biasing force of said belleville spring washer.

8. A machine tool spindle according to claim 7 wherein said second end of said elongated bar has a nut threaded thereon to adjustably maintain said belleville springs under compression.

9. A machine tool spindle as defined in claim 3 comprising additionally
   a. a centrally positioned conduit forming a fluid flow path to said tool-holding means;
   b. wherein said collet forms a means for pulling air through said flow path during rotation of a tool in said collet; and
   c. wherein said plunger comprises a fluid-actuated piston and said piston has an orifice therein forming means for fluid to flow from said plunger into the conduit of said shaft.

10. A rotatably mounted machine tool as defined in claim 9 comprising, additionally, a plunger means for pushing said shaft, said plunger means consisting of a fluid-pressurized piston member, said piston member having an orifice therein forming means for fluid to flow from said plunger into the conduit of said shaft.

11. A machine tool as defined in claim 9 wherein said plunger means is a bellows.

12. A machine tool as defined in claim 1 wherein a biasing means less resistant than said rotationally balanced biasing means is positioned to maintain said spindle-restraining means out of engagement with said spindle until brought into engagement therewith by said plunger-actuating means.

13. A machine tool as defined in claim 1 wherein said spindle-restraining means is formed of an outwardly extending flange mounted on said spindle and a collar for engaging said flange mounted for rearward movement by said plunger-actuating means to engage said flange.

14. A rotatably mounted machine tool as defined in claim 1 comprising, additionally, a plunger means for pushing said shaft, said plunger means consisting of a fluid-pressurized piston member, said piston member having an orifice therein forming means for fluid to flow from said plunger into the conduit of said shaft.

15. A rotatably mounted machine tool as defined in claim 6 and comprising
   a. a rotatably mounted shaft forming said elongated bar; and
   b. a conduit along the axis of said shaft and forming a fluid flow path through said shaft wherein said collet forms means for pulling air through said conduit into the proximity of said tool-holding means.

16. In a machine tool spindle of the type having plunger-operated rotatable collet and comprising:
   a. a rotatably body;
   b. a tool holding means slidably disposed in said body for movement between extreme positions
   c. and a symmetrically balanced biasing means positioned about the axis of rotation of said body and forming means between said body and said tool-holding means to bias said tool-holding means in a closed tool-gripping position, said tool-holding means being drivable against the bias of said biasing means to a second extreme position into an open tool-releasing position, the improvement wherein
      1. said tool-holding means consists essentially of an elongate bar threaded on opposite ends, a first end being threaded to a collet having deflectable jaws and a second end carrying said biasing means;
      2. said body has a tapered portion and said collet has an opposite and complementary-shaped tapered portion acting against said tapered portion on said body thereby deflecting said collet jaws to tighten around a tool when said biasing means is the dominant force acting on said tool-holding means;
      3. a machine tool spindle wherein said collet jaws are biased toward said open position wherein a tool is loosely held, said collet jaws being allowed to assume the free position when a plunger acts against said second end of said elongated bar and overcomes the baising force of said biasing means;
      4. and wherein said rotatable body comprises a centrally positioned conduit forming a fluid flow path to said tool-holding means and wherein said collet forms a means for pulling fluid through said flow path.

* * * * *